US011927912B2

(12) United States Patent
Sato et al.

(10) Patent No.: US 11,927,912 B2
(45) **Date of Patent: *Mar. 12, 2024**

(54) IMAGE FORMING APPARATUS AND PROCESS CARTRIDGE INCLUDING DRUM CARTRIDGE AND DEVELOPMENT CARTRIDGE

(71) Applicant: BROTHER KOGYO KABUSHIKI KAISHA, Nagoya (JP)

(72) Inventors: Shougo Sato, Seto (JP); Kazuna Taguchi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/878,309

(22) Filed: Aug. 1, 2022

(65) Prior Publication Data

US 2022/0373964 A1 Nov. 24, 2022

Related U.S. Application Data

(63) Continuation of application No. 17/343,002, filed on Jun. 9, 2021, now Pat. No. 11,442,403.

(30) Foreign Application Priority Data

Jun. 10, 2020 (JP) ................................ 2020-100886

(51) Int. Cl.
*G03G 21/16* (2006.01)
*G03G 21/18* (2006.01)

(52) U.S. Cl.
CPC ..... *G03G 21/1814* (2013.01); *G03G 21/1821* (2013.01); *G03G 21/1846* (2013.01)

(58) Field of Classification Search
CPC .......... G03G 21/1814; G03G 21/1821; G03G 21/1839; G03G 21/1842; G03G 21/1846; G03G 21/185; G03G 21/1853
See application file for complete search history.

(56) References Cited

U.S. PATENT DOCUMENTS 10,444,698 B2 * 10/2019 Fujii .................. G03G 21/1864
2007/0009281 A1 1/2007 Sato et al.
(Continued)

FOREIGN PATENT DOCUMENTS

JP 2014-186346 A 10/2014
JP 2016-4113 A 1/2016
(Continued)

*Primary Examiner* — Hoang X Ngo
(74) *Attorney, Agent, or Firm* — Merchant & Gould P.C.

(57) ABSTRACT

An image forming apparatus includes a housing having an opening, a drum cartridge, and a development cartridge. The drum cartridge is movable in a first direction through the opening between a first position at which the drum cartridge is located inside the housing and a second position at which the drum cartridge is located outside the housing. The drum cartridge includes a photosensitive drum rotatable about an axis extending in the first direction and a first handle located at a downstream end of the drum cartridge in a movement direction in which the drum cartridge moves from the first position to the second position. The development cartridge is attachable to and detachable from the drum cartridge. The development cartridge includes a development roller and a second handle located upstream of the first handle in the movement direction in a state where the development cartridge is attached to the drum cartridge.

10 Claims, 9 Drawing Sheets

(56) References Cited

U.S. PATENT DOCUMENTS

| | | | | |
|---|---|---|---|---|
| 2010/0247139 | A1* | 9/2010 | Wu | G03G 21/1846 399/111 |
| 2011/0299873 | A1 | 12/2011 | Ushiozu et al. | |
| 2015/0362888 | A1 | 12/2015 | Itabashi | |
| 2016/0252874 | A1 | 9/2016 | Fujiwara et al. | |
| 2018/0120763 | A1* | 5/2018 | Takano | G03G 15/0865 |

FOREIGN PATENT DOCUMENTS

| | | | |
|---|---|---|---|
| JP | 2016-4114 | A | 1/2016 |
| JP | 2016-4115 | A | 1/2016 |

* cited by examiner

IMAGE FORMING APPARATUS AND PROCESS CARTRIDGE INCLUDING DRUM CARTRIDGE AND DEVELOPMENT CARTRIDGE

CROSS REFERENCE TO RELATED APPLICATIONS

This application is a continuation of U.S. patent application Ser. No. 17/343,002, filed Jun. 9, 2021, now U.S. Pat. No. 11,442,403, which claims priority from Japanese Patent Application No. 2020-100886 filed Jun. 10, 2020, the disclosures which are incorporated herein by reference in their entirety.

TECHNICAL FIELD

This disclosure relates to an image forming apparatus.

BACKGROUND

Conventionally, an image forming apparatus includes a housing and a process cartridge. The process cartridge contains toner. The process cartridge includes a photosensitive drum and a development roller. The photosensitive drum is rotatable about an axis extending in a first direction. The process cartridge is movable in the first direction between a first position located inside the housing and a second position located outside the housing.

SUMMARY

According to one aspect, this specification discloses an image forming apparatus. The image forming apparatus includes a housing, a drum cartridge, and a development cartridge. The housing has an opening. The drum cartridge is movable in a first direction through the opening between a first position at which the drum cartridge is located inside the housing and a second position at which the drum cartridge is located outside the housing. The drum cartridge includes a photosensitive drum rotatable about an axis extending in the first direction and a first handle located at a downstream end of the drum cartridge in a movement direction in which the drum cartridge moves from the first position to the second position. The development cartridge is attachable to and detachable from the drum cartridge. The development cartridge includes a development roller and a second handle located upstream of the first handle in the movement direction in a state where the development cartridge is attached to the drum cartridge.

According to another aspect, this specification also discloses a process cartridge. The process cartridge includes a drum cartridge and a development cartridge. The drum cartridge has one end and an other end located away from the one end in a first direction. The drum cartridge includes a photosensitive drum rotatable about an axis extending in the first direction and a first handle located at the one end. The development cartridge is attachable to and detachable from the drum cartridge. The development cartridge includes a development roller and a second handle located between the one end and the other end in a state where the development cartridge is attached to the drum cartridge.

BRIEF DESCRIPTION OF THE DRAWINGS

Embodiments in accordance with this disclosure will be described in detail with reference to the following figures wherein.

DETAILED DESCRIPTION

In the above image forming apparatus, when the development roller needs to be replaced, the entire process cartridge including the photosensitive drum needs to be replaced even through the photosensitive drum does not need to be replaced. With such an image forming apparatus, it is difficult to reduce the usage cost.

Thus, it is considered to separate the process cartridge into a development cartridge including a development roller and a drum cartridge including a photosensitive drum, and to replace the development cartridge and the drum cartridge individually.

However, if the development cartridge and the drum cartridge are separated, when replacing either one of the development cartridge and the drum cartridge, a user needs to determine the cartridge to be replaced and pull the cartridge out of the housing in a state where the development cartridge and the drum cartridge are located in the housing. Thus, the replacement work of the development cartridge or the drum cartridge may become complicated.

In view of the foregoing, an aspect of an objective of this disclosure is to provide an image forming apparatus in which a development cartridge and a drum cartridge can be replaced individually and smoothly.

1. Image Forming Apparatus 1

An image forming apparatus 1 will be described with reference to FIGS. 1 to 5.

Figure 1:
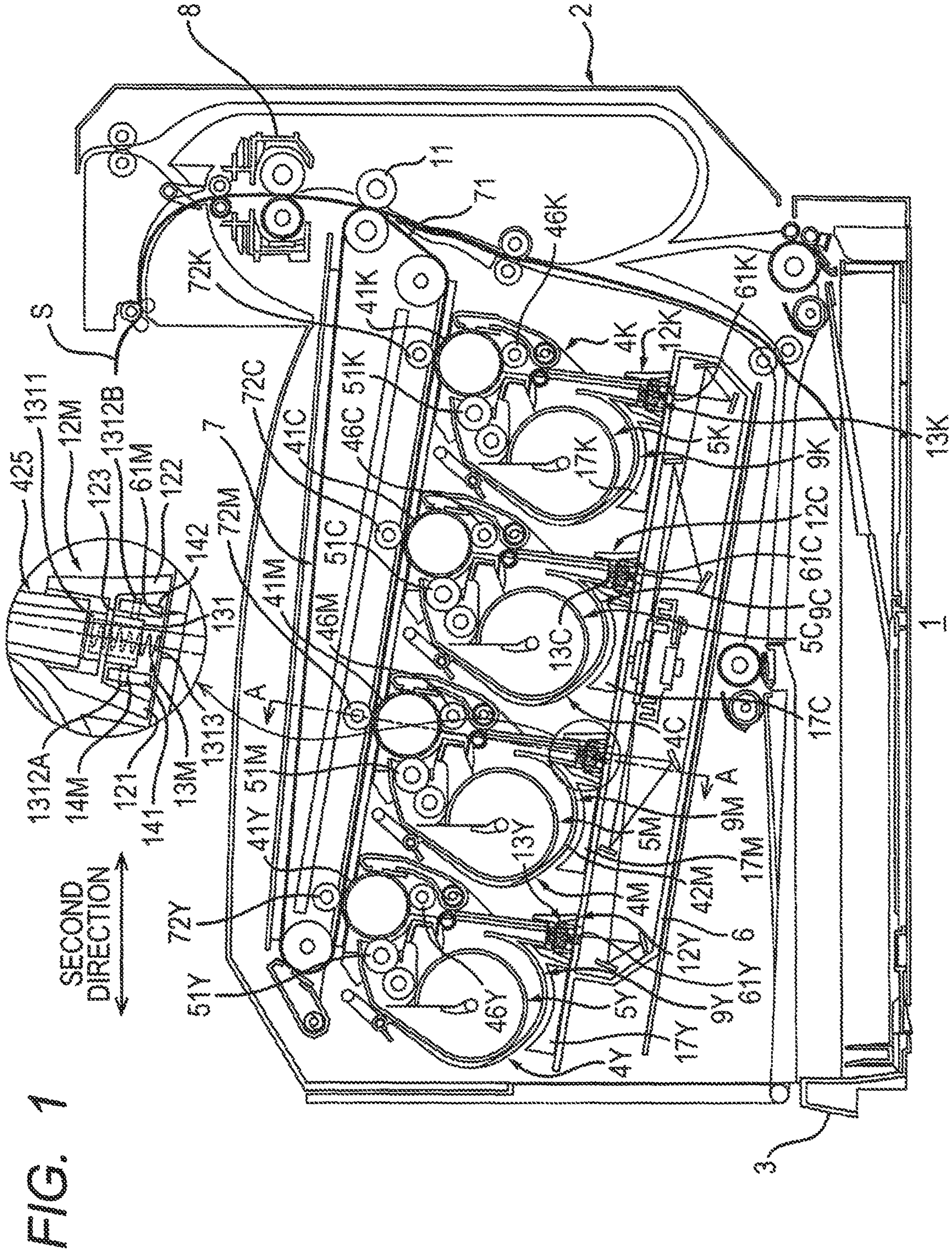
FIG. 1 shows a schematic configuration of an image forming apparatus.

As shown in FIG. 1, the image forming apparatus 1 includes a housing 2, a cover 10 (see FIG. 2), a sheet cassette 3, four process cartridges 9Y, 9M, 9C, 9K, an exposure device 6, an intermediate transfer device 7, a secondary transfer roller 11, and a fixing device 8.

1.1 Housing 2

The housing 2 accommodates the sheet cassette 3, the four process cartridges 9Y, 9M, 9C, 9K, the exposure device 6, the intermediate transfer device 7, the secondary transfer roller 11, and the fixing device 8.

Figure 2:
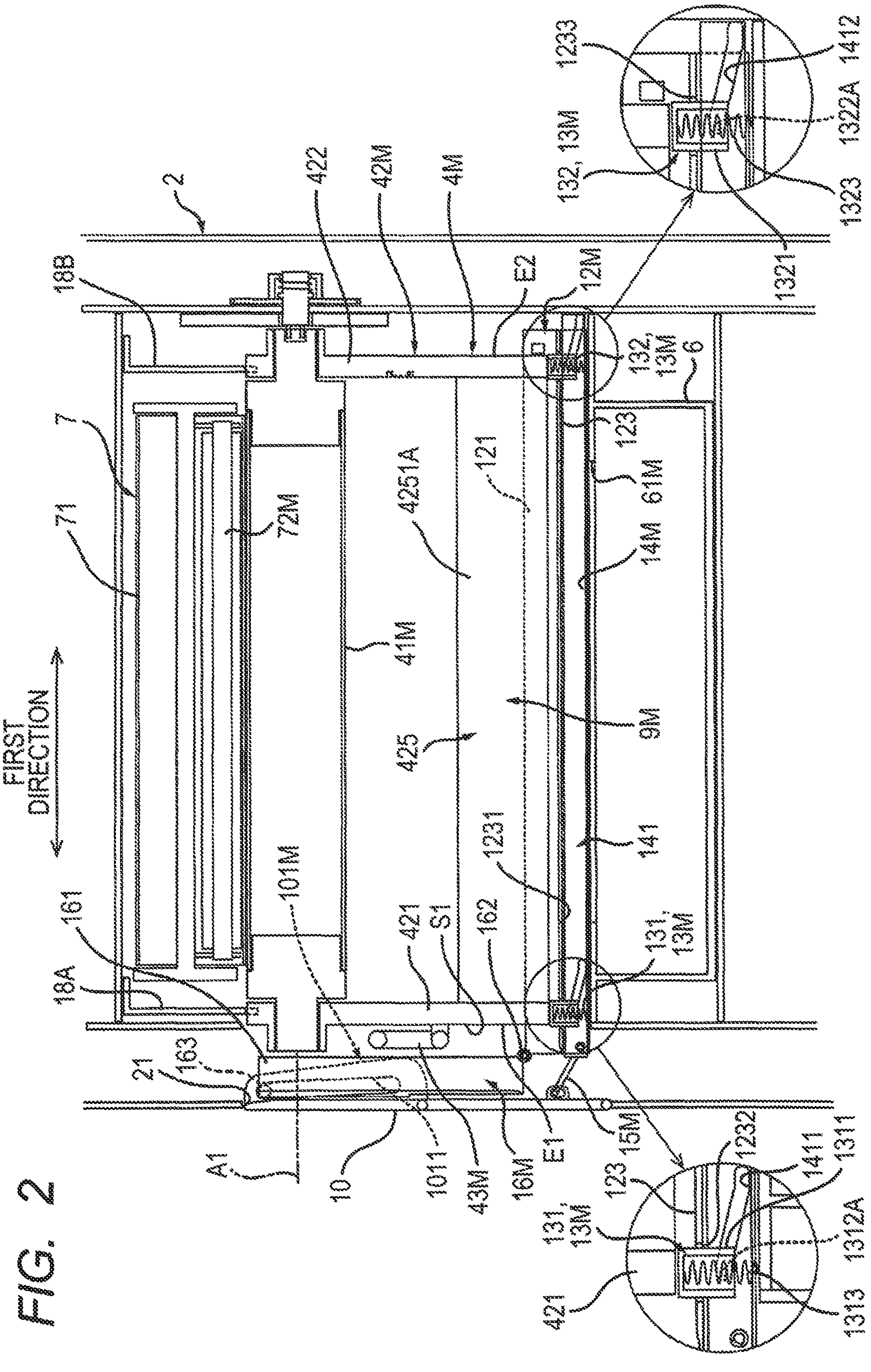
FIG. 2 is a cross-sectional view taken along a line A-A of the image forming apparatus shown in FIG. 1, showing a state where a cover is located at a closed position and a drum cartridge is located at a first position.

As shown in FIG. 2, the housing 2 has an opening 21. The opening 21 is located at one outer surface of the housing 2 in the first direction. The first direction is the direction in which an axis A1 of a photosensitive drum 41M extends. The photosensitive drum 41M will be described later.

1.2 Cover 10

Figure 3:
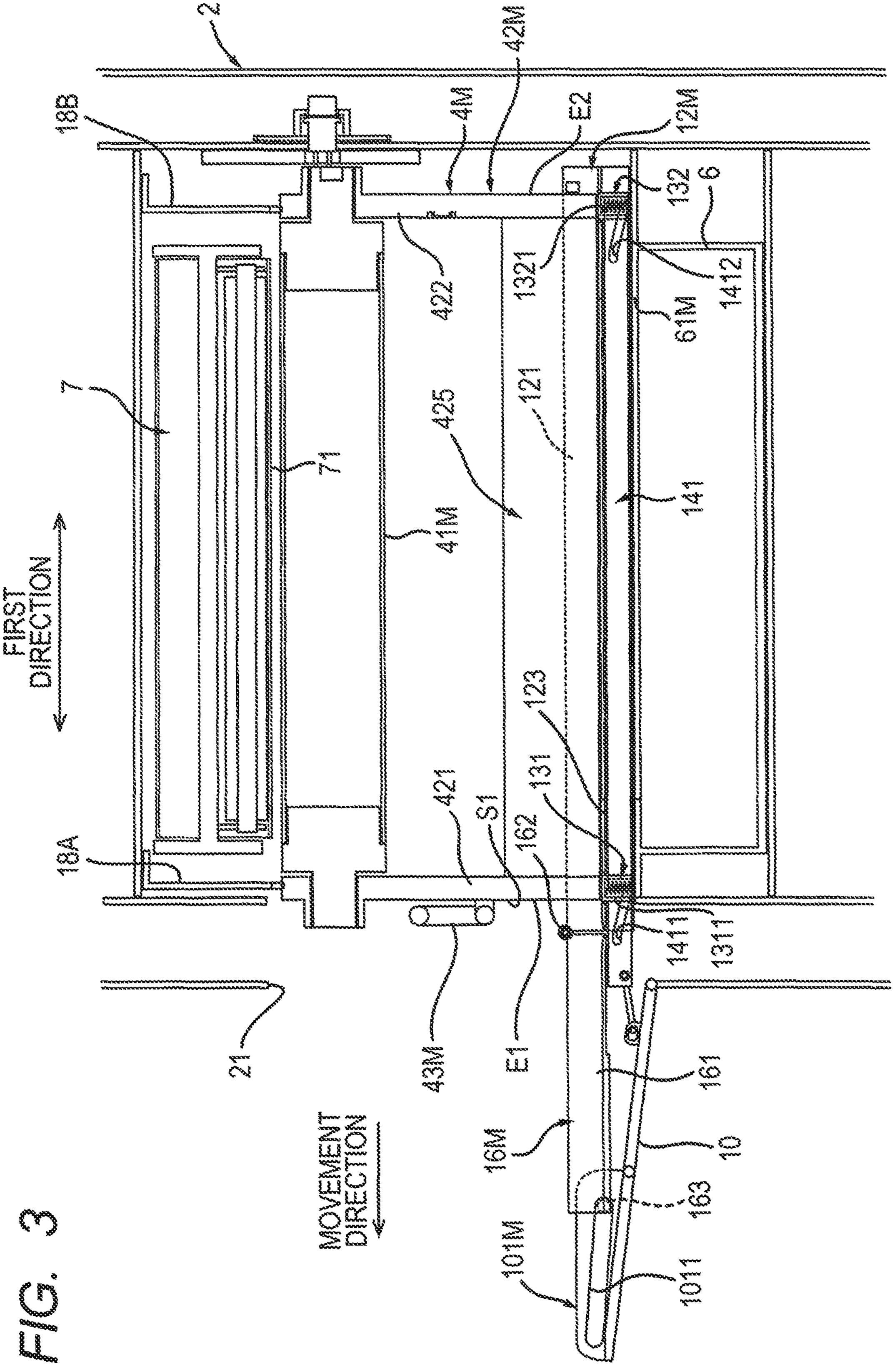
FIG. 3 is a cross-sectional view taken along the line A-A of the image forming apparatus shown in FIG. 1, showing a state where the cover is located at an open position and the drum cartridge is located at the first position.

As shown in FIGS. 2 and 3, the cover 10 is movable between an open position (see FIG. 3) and a closed position (see FIG. 2). The opening 21 opens in a state where the cover 10 is located at the open position. The cover 10 closes the opening 21 in a state where the cover 10 is located at the closed position.

1.3 Sheet Cassette 3

As shown in FIG. 1, the sheet cassette 3 accommodates a sheet S. The sheet S in the sheet cassette 3 is conveyed toward the secondary transfer roller 11.

1.4 Four Process Cartridges 9Y, 9M, 9C, 9K

The four process cartridges 9Y, 9M, 9C, and 9K are arranged in this order in a second direction. The second direction crosses the first direction. The four process cartridges 9Y, 9M, 9C, and 9K have the same configuration as each other. Thus, the process cartridge 9M will be described in detail, and the description of the process cartridges 9Y, 9C, and 9K will be omitted.

1.4.1 Process Cartridge 9M

Figure 5:
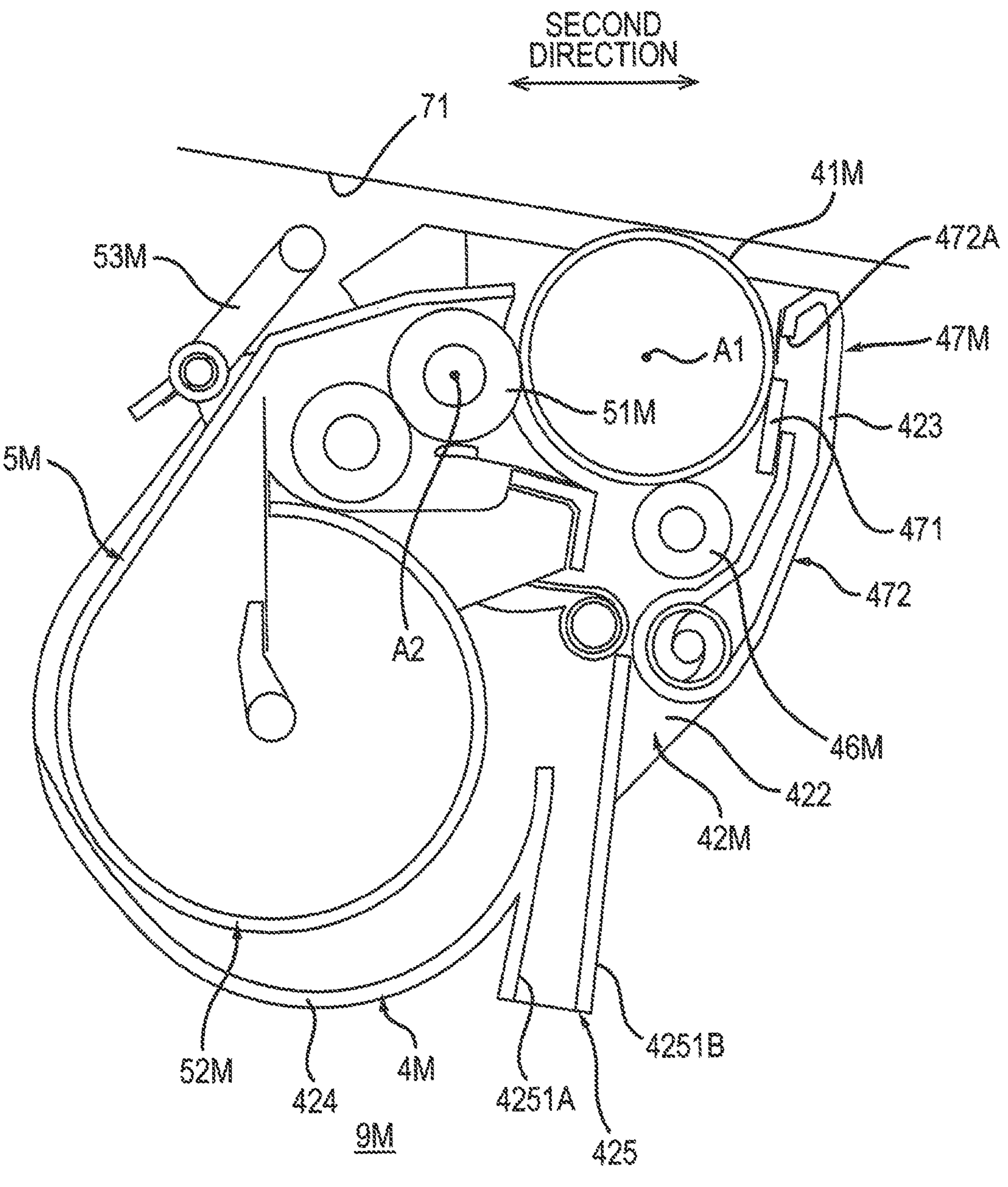
FIG. 5 is an enlarged view of the process cartridge shown in FIG. 1.

As shown in FIG. 5, the process cartridge 9M includes a drum cartridge 4M and a development cartridge 5M.

1.4.1.1 Drum Cartridge 4M

The drum cartridge 4M includes a photosensitive drum 41M and a charging device 46M.

The photosensitive drum 41M extends in the first direction. The photosensitive drum 41M has a cylindrical shape. The photosensitive drum 41M is rotatable about the axis A1. The axis A1 extends in the first direction.

The charging device 46M charges the circumferential surface of the photosensitive drum 41M. Specifically, the charging device 46M is a charging roller. The charging device 46M may be a scorotron charger.

Figure 4:
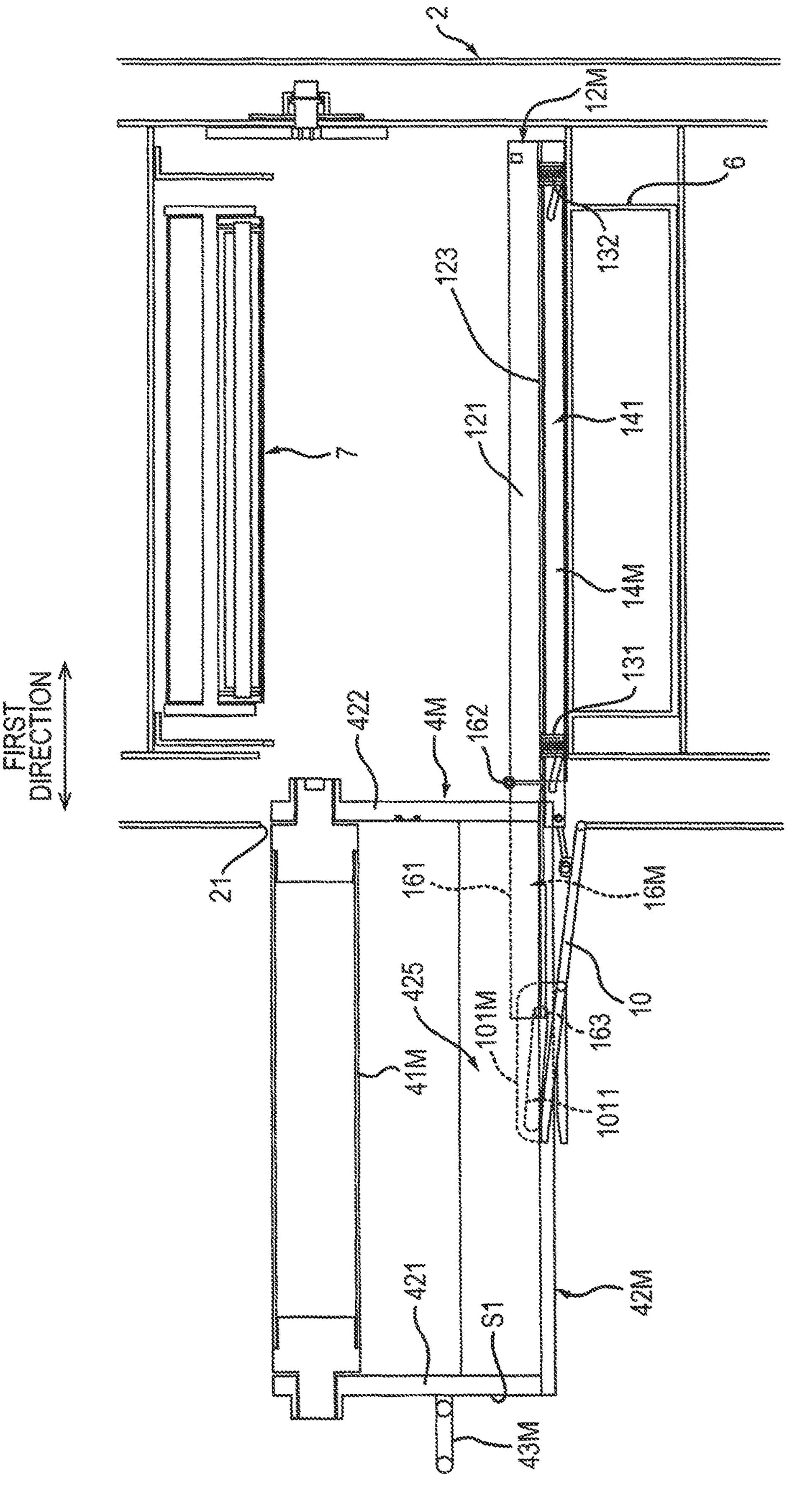
FIG. 4 is a cross-sectional view taken along the line A-A of the image forming apparatus shown in FIG. 1, showing a state where the cover is located at the open position and the drum cartridge is located at a second position.

As shown in FIGS. 3 and 4, the drum cartridge 4M is movable in the first direction through the opening 21 between a first position (see FIG. 3) and a second position (see FIG. 4). In a state where the drum cartridge 4M is located at the first position, the entirety of the drum cartridge 4M is located in the housing 2. In a state where the drum cartridge 4M is located at the second position, at least part of the drum cartridge 4M is located outside the housing 2.

1.4.1.2 Development Cartridge 5M

As shown in FIG. 5, the development cartridge 5M contains toner. The development cartridge 5M includes a development roller 51M. The development roller 51M extends in the first direction. The development roller 51M is rotatable about an axis A2. The axis A2 extends in the first direction.

The development cartridge 5M is attachable to and detachable from the drum cartridge 4M. Thus, the development cartridge 5M containing toner and including the development roller 51M and the drum cartridge 4M including the photosensitive drum 41M can be individually replaced.

In a state where the development cartridge 5M is attached to the drum cartridge 4M, the development roller 51M contacts the photosensitive drum 41M. In a state where the development roller 51M is in contact with the photosensitive drum 41M, the development roller 51M supplies toner to the photosensitive drum 41M.

1.4.2 Process Cartridges 9Y, 9C, 9K

As shown in FIG. 1, the process cartridge 9Y includes a drum cartridge 4Y and a development cartridge 5Y. The drum cartridge 4Y includes a photosensitive drum 41Y and a charging device 46Y. The development cartridge 5Y includes a development roller 51Y. The development cartridge 5Y is attachable to and detachable from the drum cartridge 4Y.

The process cartridge 9C includes a drum cartridge 4C and a development cartridge 5C. The drum cartridge 4C includes a photosensitive drum 41C and a charging device 46C. The development cartridge 5C includes a development roller 51C. The development cartridge 5C is attachable to and detachable from the drum cartridge 4C.

The process cartridge 9K includes a drum cartridge 4K and a development cartridge 5K. The drum cartridge 4K includes a photosensitive drum 41K and a charging device 46K. The development cartridge 5K includes a development roller 51K. The development cartridge 5K is attachable to and detachable from the drum cartridge 4K.

In other words, the image forming apparatus 1 includes the four drum cartridges 4Y, 4M, 4C, 4K and the four development cartridges 5Y, 5M, 5C, 5K.

1.5. Exposure Device 6

The exposure device 6 exposes the surfaces of four photosensitive drums 41Y, 41M, 41C, and 41K. In a state where the drum cartridge 4M is located at the first position, the exposure device 6 is located below the drum cartridge 4M. The "below" means downward in the gravity direction when the image forming apparatus 1 is placed in a normal use state.

The exposure device 6 has four light emitting openings 61Y, 61M, 61C, and 61K. The four light emitting openings 61Y, 61M, 61C, and 61K are arranged with an interval from each other in the second direction.

The light emitting opening 61Y emits light that exposes the charged surface of the photosensitive drum 41Y. As a result, an electrostatic latent image is formed on the surface of the photosensitive drum 41Y. The light emitting opening 61M emits light that exposes the charged surface of the photosensitive drum 41M. As a result, an electrostatic latent image is formed on the surface of the photosensitive drum 41M. The light emitting opening 61C emits light that exposes the charged surface of the photosensitive drum 41C. As a result, an electrostatic latent image is formed on the surface of the photosensitive drum 41C. The light emitting opening 61K emits light that exposes the charged surface of the photosensitive drum 41K. As a result, an electrostatic latent image is formed on the surface of the photosensitive drum 41K.

Specifically, the exposure device 6 is a laser scan unit. The exposure device 6 may be an LED array.

1.6 Intermediate Transfer Device 7

In a state where the drum cartridge 4M located is located at the first position, the intermediate transfer device 7 is located at the opposite side of the exposure device 6 with respect to the drum cartridge 4M. The intermediate transfer device 7 includes an intermediate transfer belt 71 and four primary transfer rollers 72Y, 72M, 72C, and 72K.

In a state where the four drum cartridges 4Y, 4M, 4C, and 4K are located at the first position, the intermediate transfer belt 71 contacts the four photosensitive drums 41Y, 41M, 41C, and 41K. In a state where the four drum cartridges 4Y, 4M, 4C, and 4K are located at the first position, the intermediate transfer belt 71 passes between the photosensitive drum 41Y and the primary transfer roller 72Y, between the photosensitive drum 41M and the primary transfer roller 72M, between the photosensitive drum 41C and the primary transfer roller 72C, and between the photosensitive drum 41K and the primary transfer roller 72K.

The primary transfer roller 72Y transfers the toner on the photosensitive drum 41Y to the intermediate transfer belt 71.

The primary transfer roller 72M transfers the toner on the photosensitive drum 41M to the intermediate transfer belt 71. The primary transfer roller 72C transfers the toner on the photosensitive drum 41C to the intermediate transfer belt 71. The primary transfer roller 72K transfers the toner on the photosensitive drum 41K to the intermediate transfer belt 71.

1.7 Secondary Transfer Roller 11

The secondary transfer roller 11 is aligned with the intermediate transfer device 7 in the second direction. The secondary transfer roller 11 contacts the intermediate transfer belt 71. The sheet S conveyed from the sheet cassette 3 passes between the intermediate transfer belt 71 and the secondary transfer roller 11. At this time, the secondary transfer roller 11 transfers the toner transferred to the intermediate transfer belt 71 to the sheet S.

1.8 Fixing Device 8

The fixing device 8 heats and pressurizes the sheet S on which the toner is transferred to fix the toner on the sheet S. The sheet S that has passed through the fixing device 8 is discharged to the upper surface of the housing 2.

2. Details of Drum Cartridge 4M

Next, the details of the drum cartridge 4M will be described with reference to FIGS. 5 to 9.

Figure 6:
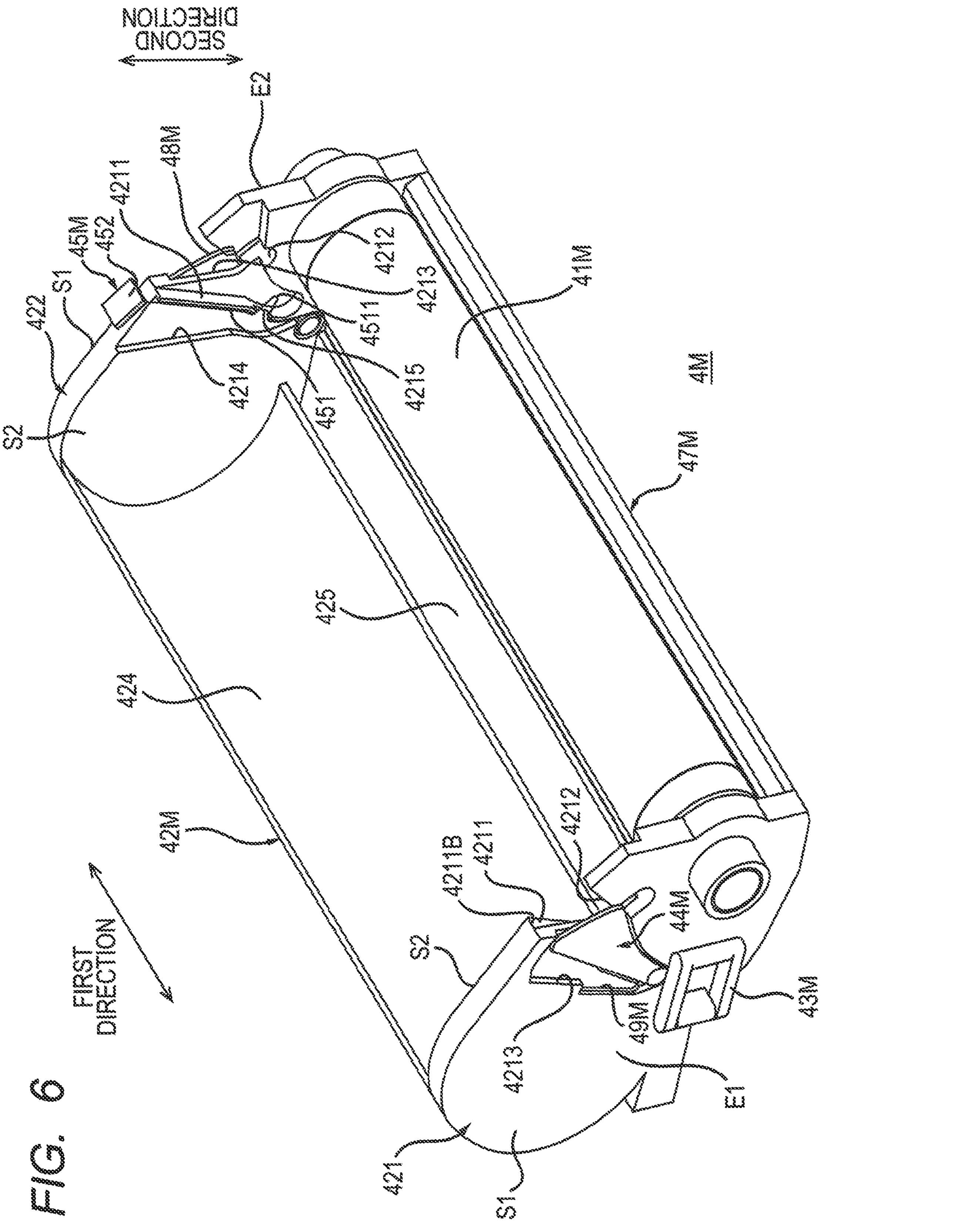
FIG. 6 is a perspective view of the drum cartridge shown in FIG. 5.

As shown in FIG. 6, the drum cartridge 4M extends in the first direction. The drum cartridge 4M has one end E1 and an other end E2 in the first direction. The other end E2 of the drum cartridge 4M is located away from the one end E1 of the drum cartridge 4M.

The drum cartridge 4M includes a drum frame 42M, a drum cleaner 47M, a first pressing member 44M, a second pressing member 48M, a spring 49M, a lock 45M, and a first handle 43M, in addition to the photosensitive drum 41M and the charging device 46M (see FIG. 1) described above. In other words, the image forming apparatus 1 includes the first pressing member 44M, the second pressing member 48M, and the lock 45M.

2.1 Drum Frame 42M

The drum frame 42M supports the photosensitive drum 41M, the charging device 46M, the drum cleaner 47M, the first pressing member 44M, the second pressing member 48M, the spring 49M, the lock 45M, and the first handle 43M. The drum frame 42M includes a first side plate 421, a second side plate 422, a bottom plate 424, and a slide portion 425.

2.1.1 First Side Plate 421

The first side plate 421 is located at the one end E1 of the drum cartridge 4M. The first side plate 421 supports one end of the photosensitive drum 41M in the first direction. The first side plate 421 has an outer surface S1 and an inner surface S2 in the first direction. The outer surface S1 is located at the opposite side of the second side plate 422 with respect to the inner surface S2 in the first direction. The first side plate 421 includes a first guide 4211, a second guide 4212, and a first groove 4213.

The first guide 4211 guides attachment and detachment of the development cartridge 5M relative to the drum cartridge 4M. The first guide 4211 guides a first boss 522A when the development cartridge 5M is attached to or detached from the drum cartridge 4M. The first boss 522A will be described later. The first guide 4211 is located at the inner surface S2. More specifically, the first guide 4211 is a groove. The first guide 4211 extends in the circumferential direction of the photosensitive drum 41M.

Figure 7:
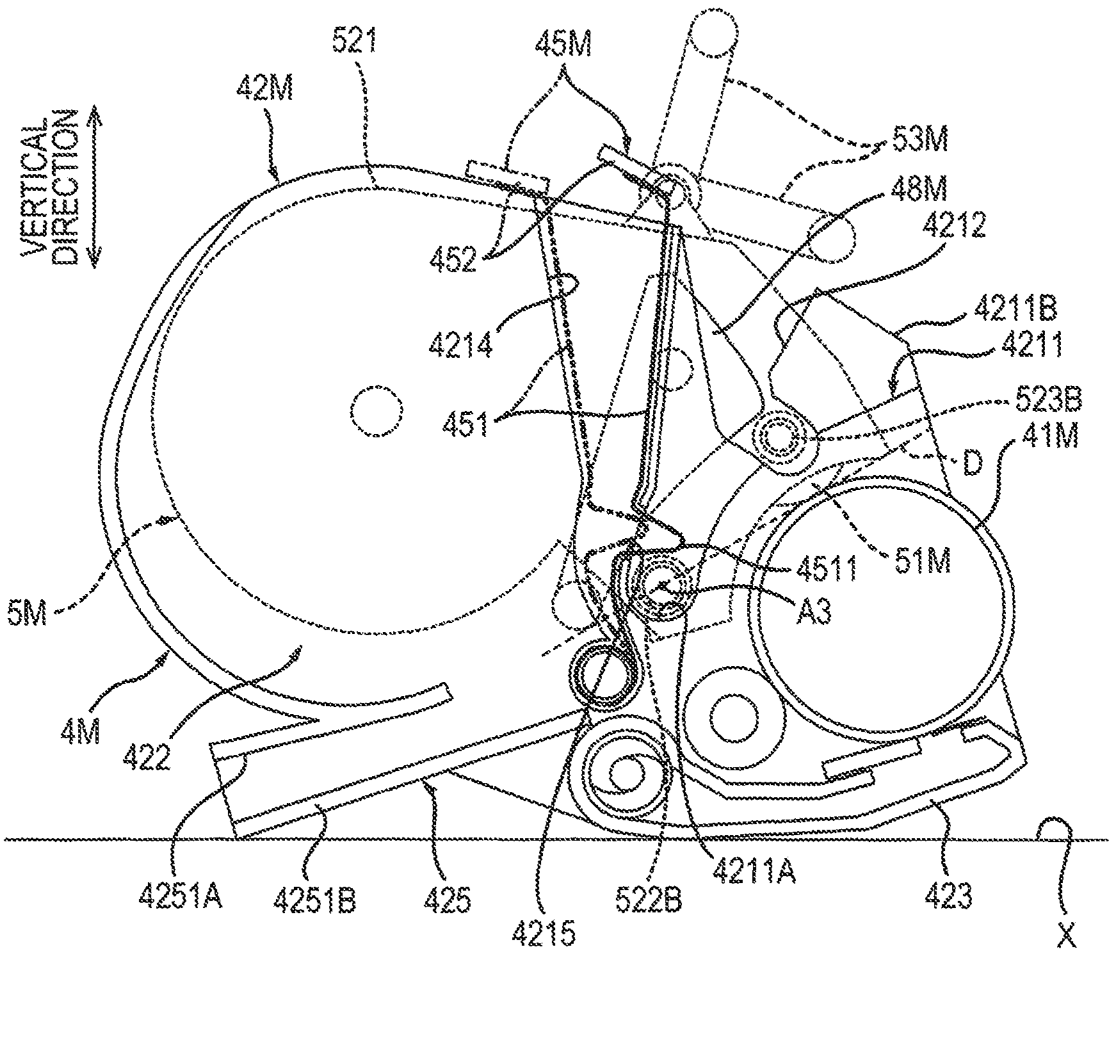
FIG. 7 is an explanatory diagram for explaining a state where the process cartridge shown in FIG. 5 is placed on a placement surface.

The first guide 4211 includes a first end 4211A (see FIG. 7) and a second end 4211B (see FIG. 7). The first end 4211A is located away from the photosensitive drum 41M in the radial direction of the photosensitive drum 41M (see FIG. 7). The second end 4211B is located away from the first end 4211A. The second end 4211B is located at an edge of the first side plate 421. The second end 4211B is opened.

The second guide 4212 guides a second boss 523A when the development cartridge 5M rotationally moves relative to the photosensitive drum 41M. The second boss 523A will be described later. The second guide 4212 is located in the first guide 4211 (see FIG. 7). The second guide 4212 is formed to penetrate the first side plate 421 in the first direction.

The first pressing member 44M and the spring 49M are arranged in the first groove 4213. The first groove 4213 is located at the outer surface S1. The first groove 4213 is located at the opposite side of the photosensitive drum 41M with respect to the second guide 4212. The first groove 4213 communicates with the second guide 4212.

2.1.2 Second Side Plate 422

The second side plate 422 is located at the other end E2 of the drum cartridge 4M. The second side plate 422 is located away from the first side plate 421 in the first direction. The second side plate 422 supports the other end of the photosensitive drum 41M in the first direction. Except that a second groove 4214 is provided at the second side plate 422, the description of the first side plate 421 is applied in the same way to the second side plate 422. Thus, the description of the second side plate 422 will be omitted.

The lock 45M is arranged in the second groove 4214. The second groove 4214 is located at the inner surface S2. The second groove 4214 is located at the opposite side of the photosensitive drum 41M with respect to the first guide 4211. The second groove 4214 communicates with the first guide 4211 through an opening 4215.

2.1.3 Bottom Plate 424

The bottom plate 424 is located between the first side plate 421 and the second side plate 422 in the first direction. The bottom plate 424 has an arc-like shape. The bottom plate 424 extends in the first direction. One end of the bottom plate 424 in the first direction is connected to the first side plate 421. The other end of the bottom plate 424 in the first direction is connected to the second side plate 422.

2.1.4 Slide Portion 425

In a state where the drum cartridge 4M is located at the first position, the slide portion 425 is fitted to a rail 12M. When the drum cartridge 4M moves between the first position and the second position, the slide portion 425 slides along the rail 12M. The rail 12M will be described later.

As shown in FIG. 5, the slide portion 425 is located between the first side plate 421 and the second side plate 422 in the first direction. The slide portion 425 is located between the bottom plate 424 and the drum cleaner 47M in the second direction. The slide portion 425 extends in the first direction. The slide portion 425 includes two side walls 4251A and 4251B.

In a state where the drum cartridge 4M is located at the first position, each of the two side walls 4251A and 4251B extends in the vertical direction. The side wall 4251A is connected to the bottom plate 424. The side wall 4251B is located away from the side wall 4251A in the second direction. The side wall 4251B is located at the opposite side of the bottom plate 424 with respect to the side wall 4251A.

2.2 Drum Cleaner 47M

The drum cleaner 47M is for cleaning the surface of the photosensitive drum 41M. In a state where the development cartridge 5M is attached to the drum cartridge 4M, the drum cleaner 47M is located at the opposite side of the development roller 51M with respect to the axis A1 of the photosensitive drum 41M in the second direction. The drum cleaner 47M includes a cleaning blade 471 and a cleaner housing 472.

In a state where the drum cartridge 4M is located at the first position, the cleaning blade 471 extends in the vertical direction. The cleaning blade 471 has an edge contacting the surface of the photosensitive drum 41M. When the photosensitive drum 41M rotates, the cleaning blade 471 scrapes off toner remaining on the surface of the photosensitive drum 41M from the surface of the photosensitive drum 41M as waste toner.

The cleaner housing 472 houses the waste toner. The cleaner housing 472 supports the cleaning blade 471. The cleaner housing 472 has an opening 472A. The waste toner scraped off with the cleaning blade 471 is received in the opening 472A.

The cleaner housing 472 has a wall 423. In other words, the drum cartridge 4M includes the wall 423. In a state where the development cartridge 5M is attached to the drum cartridge 4M, the wall 423 is located at the opposite side of the development roller 51M with respect to the photosensitive drum 41M. The wall 423 is located at the opposite side of the photosensitive drum 41M with respect to the cleaning blade 471.

As shown in FIG. 7, the wall 423 is located at the opposite side of the second end 4211B of the first guide 4211 with respect to the first end 4211A of the first guide 4211. In other words, the first guide 4211 extends from the first end 4211A toward the second end 4211B in a direction away from the wall 423.

Figure 9:
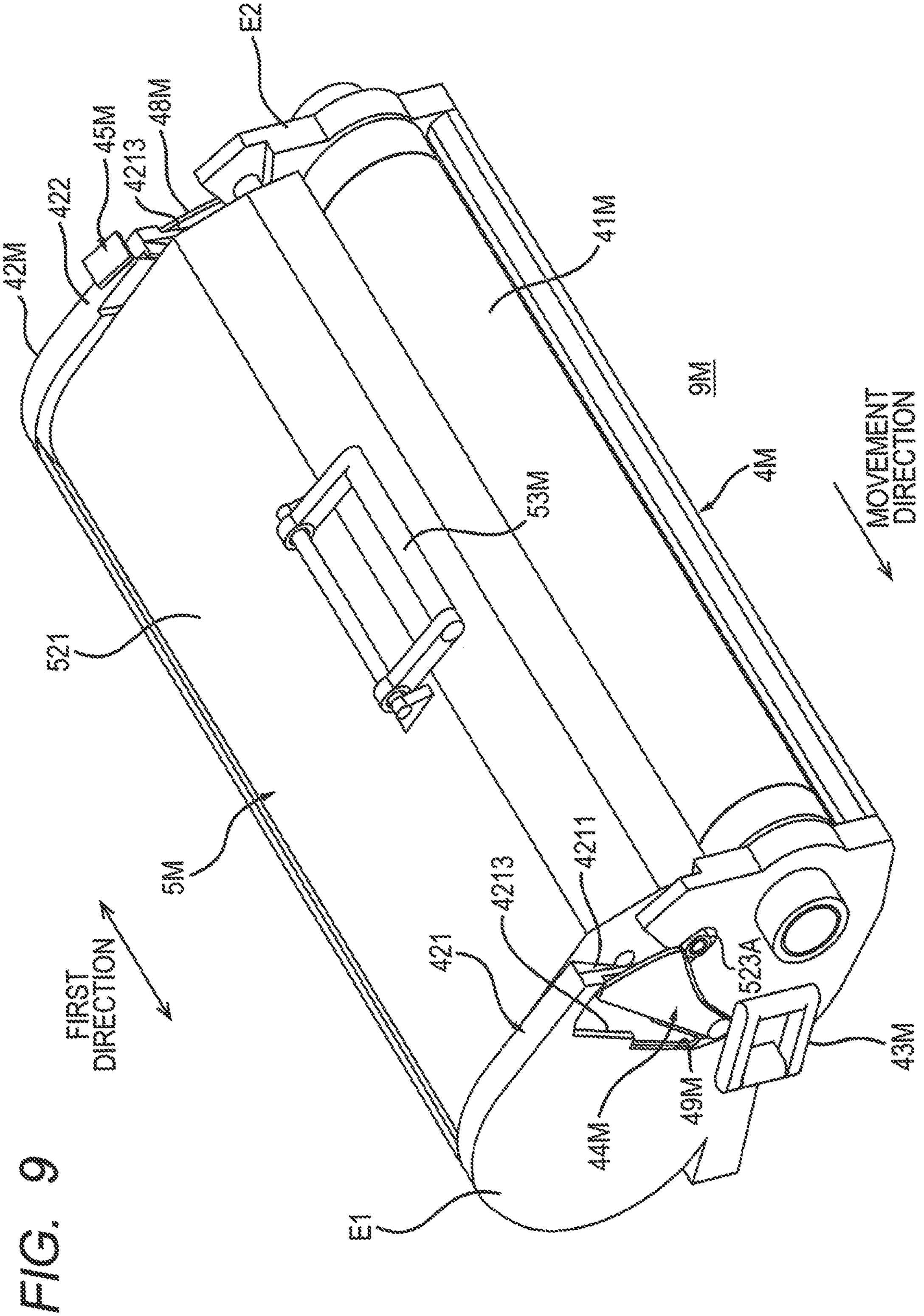
FIG. 9 is a perspective view of the process cartridge shown in FIG. 5.

2.3 First Pressing Member 44M, Spring 49M, and Second Pressing Member 48M As shown in FIG. 9, in a state where the development cartridge 5M is attached to the drum cartridge 4M, the first pressing member 44M presses the development roller 51M toward the photosensitive drum 41M. This allows the development roller 51M to contact the photosensitive drum 41M stably in a state where the development cartridge 5M is attached to the drum cartridge 4M. The first pressing member 44M is supported by the drum frame 42M.

The first pressing member 44M is located in the first groove 4213 of the first side plate 421. The first pressing member 44M is supported by the first side plate 421. The first pressing member 44M is rotationally movable about an axis. The axis of the first pressing member 44M extends in the first direction. In a state where the development cartridge 5M is attached to the drum cartridge 4M, the first pressing member 44M is located at the opposite side of the photosensitive drum 41M with respect to the second boss 523A and contacts the second boss 523A.

The spring 49M presses the first pressing member 44M toward the photosensitive drum 41M. The spring 49M is located in the first groove 4213. In a state where the development cartridge 5M is attached to the drum cartridge 4M, the spring 49M is located at the opposite side of the second boss 523A with respect to the first pressing member 44M.

As shown in FIG. 7, in a state where the development cartridge 5M is attached to the drum cartridge 4M, the second pressing member 48M operates in cooperation with the first pressing member 44M to press the development roller 51M toward the photosensitive drum 41M. The second pressing member 48M is supported by the drum frame 42M. The second pressing member 48M is located in the first groove 4213 of the second side plate 422. The second pressing member 48M is supported by the second side plate 422. The description of the first pressing member 44M is applied in the same way to the second pressing member 48M. Thus, the description of the second pressing member 48M will be omitted.

2.4 Lock 45M

The lock 45M is movable between a lock position and a lock release position. In FIG. 7, the lock 45M at the lock position is indicated by solid lines, and the lock 45M at the lock release position is indicated by double-dot chain lines. In a state where the development cartridge 5M is attached to the drum cartridge 4M and the lock 45M is located at the lock position, the lock 45M restricts detachment of the development cartridge 5M from the drum cartridge 4M. This makes it unlikely that the development cartridge 5M will unintentionally be separated from the drum cartridge 4M. In a state where the development cartridge 5M is attached to the drum cartridge 4M and the lock 45M is located at the lock release position, the lock 45M releases the lock of the development cartridge 5M relative to the drum cartridge 4M.

The lock 45M is located at the other end E2 of the drum cartridge 4M. The lock 45M is supported by the second side plate 422. The lock 45M is urged toward the lock position. The lock 45M includes a spring 451 and an operation portion 452.

The spring 451 is located in the second groove 4214 of the second side plate 422. The spring 451 is located at the opposite side of the second pressing member 48M with respect to the second side plate 422 in the first direction. The spring 451 has a linear shape. The spring 451 has one end and an other end. The one end of spring 451 is fixed to the second side plate 422. The other end of the spring 451 is located away from the one end of the spring 451. The operation portion 452 is provided at the other end of the spring 451. The spring 451 includes a protruding portion 4511. The protruding portion 4511 is located between the one end and the other end of the spring 451. The protruding portion 4511 has a top pointed toward the photosensitive drum 41M.

In a state where the lock 45M is located at the lock position, the protruding portion 4511 is located in the first guide 4211 through the opening 4215. In a state where the development cartridge 5M is attached to the drum cartridge 4M and the lock 45M is located at the lock position, the protruding portion 4511 restricts separation of a first boss 522B from the first end 4211A of the first guide 4211. In a state where the lock 45M is located at the lock release position, the protruding portion 4511 is located in the second groove 4214. In a state where the development cartridge 5M is attached to the drum cartridge 4M and the lock 45M is located at the lock release position, the first boss 522B is movable from the first end 4211A toward the second end 4211B of the first guide 4211.

The operation portion 452 is operated by a user. As the user operates the operation portion 452, the lock 45M moves from the lock position to the lock release position.

2.5 First Handle 43M

As shown in FIGS. 3 and 4, the first handle 43M is located at a downstream end of the drum cartridge 4M in a movement direction in which the drum cartridge 4M moves from the first position to the second position. The first handle 43M is located at the one end E1 of the drum cartridge 4M. The first handle 43M is attached to the outer surface S1 of the first side plate 421. In a state where the development cartridge 5M is attached to the drum cartridge 4M and the drum cartridge 4M is located at the first position and the cover 10 is located at the open position, the first handle 43M is exposed through the opening 21 as viewed in the first direction. The axial direction of the photosensitive drum 41M and the movement direction of the drum cartridge 4M may be parallel, or may not be parallel and may have an angle of several degrees.

The first handle 43M is rotationally movable between a folded position (see FIG. 3) and a protruding position (see FIG. 4). In a state where the first handle 43M is located at the folded position, the first handle 43M extends in the vertical direction along the outer surface S1 of the first side plate 421. In a state where the first handle 43M is located at the protruding position, the first handle 43M extends in the first direction from the outer surface S1.

2.6 Placement State of Drum Cartridge 4M

The drum cartridge 4M is detachable from the housing 2. More specifically, as shown in FIG. 4, in a state where the drum cartridge 4M is located at the second position, the drum cartridge 4M is detachable from the housing 2. As shown in FIG. 7, the drum cartridge 4M is placed on a placement surface X in a state where the drum cartridge 4M is detached from the housing 2. The placement surface X extends in a horizontal direction, for example.

In a state where the drum cartridge 4M is detached from the housing 2 and is placed, the wall 423 and the side wall 4251B contact the placement surface X. In a state where the drum cartridge 4M is detached from the housing 2 and is placed on the placement surface X, the first guide 4211 extends upward. This allows the development cartridge 5M to be attached smoothly to the drum cartridge 4M from above in a state where the drum cartridge 4M is detached from the housing 2 and is placed on the placement surface X. The "above" in FIG. 7 means upward in a gravitational direction when the drum cartridge 4M is placed on the placement surface X.

3. Detail of Development Cartridge 5M

The development cartridge 5M will be described in detail next by referring to FIGS. 7 to 9.

Figure 8:
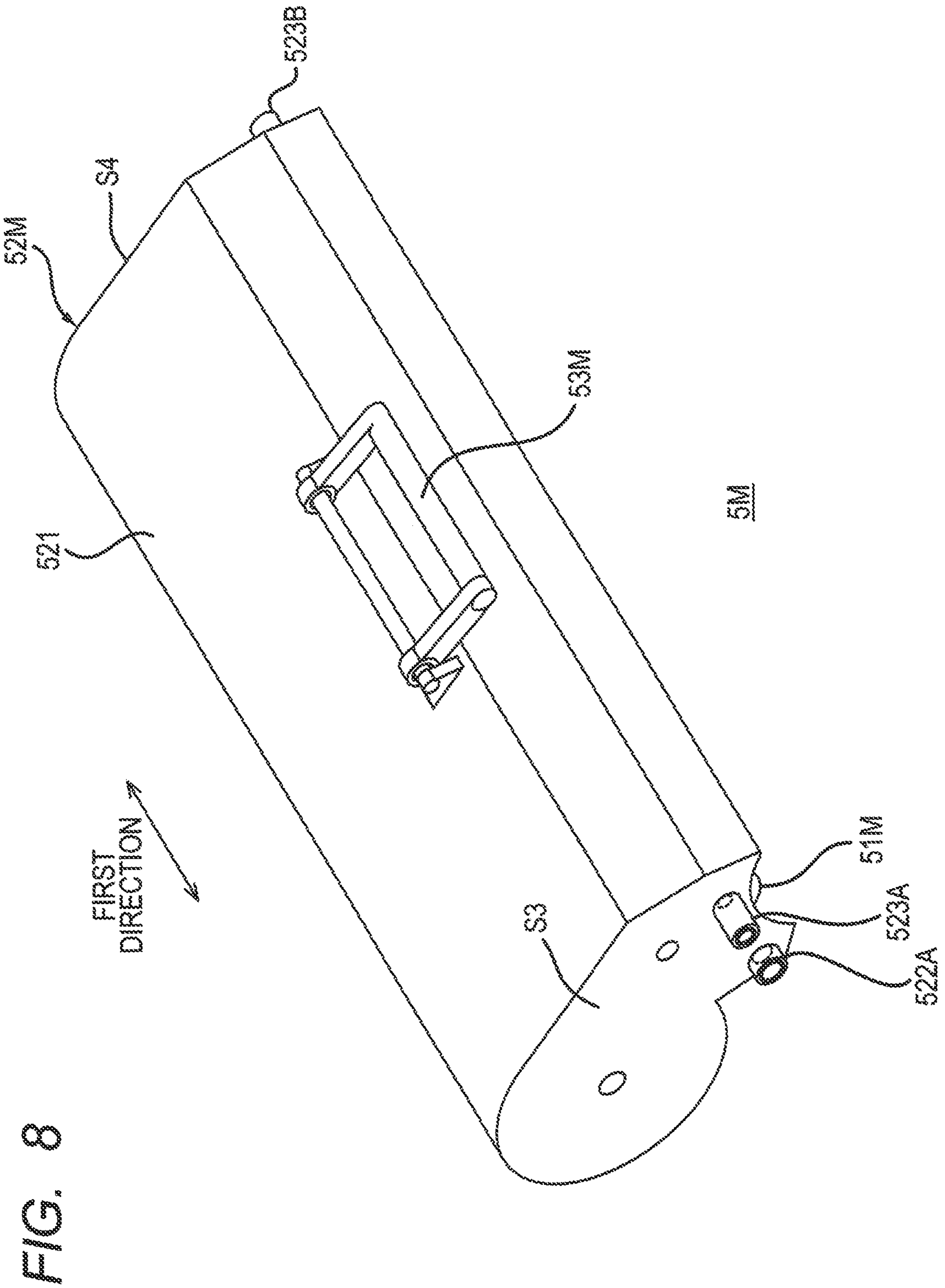
FIG. 8 is a perspective view of a development cartridge shown in FIG. 5.

As shown in FIG. 8, the development cartridge 5M includes a development frame 52M and a second handle 53M, in addition to the development roller 51M described above.

3.1 Development Frame 52M

The development frame 52M supports the development roller 51M. The development frame 52M includes a development housing 521, two first bosses 522A and 522B (see FIG. 7), and two second bosses 523A and 523B.

The development housing 521 stores toner. The development housing 521 supports the development roller 51M. The development housing 521 extends in the first direction. The development housing 521 includes a first side surface S3 and a second side surface S4 in the first direction.

The first side surface S3 is located at one end of the development housing 521 in the first direction. The second side surface S4 is located at the other end of the development housing 521 in the first direction. The second side surface S4 is located away from the first side surface S3 in the first direction.

The first boss 522A is located at the first side surface S3 of the development housing 521. The first boss 522A has a circular cylindrical shape. The first boss 522A extends in the first direction. The first boss 522B is located at the second side surface S4 of the development housing 521. The description of the first boss 522A is applied in the same way to the first boss 522B.

As shown in FIG. 7, in a state where the development cartridge 5M is attached to the drum cartridge 4M, the first boss 522B is fitted to the first end 4211A of the first guide 4211. In a state where the development cartridge 5M is attached to the drum cartridge 4M, the development cartridge 5M is rotationally movable about an axis A3 of the first boss 522B with respect to the photosensitive drum 41M. This makes the development roller 51M movable relative to the photosensitive drum 41M. The axis A3 of the first boss 522B is located on a tangent D between the photosensitive drum 41M and the development roller 51M in contact with each other.

As shown in FIG. 8, the second boss 523A is located at the first side surface S3 of the development housing 521. The second boss 523A is located away from the first boss 522A. The second boss 523A has a circular cylindrical shape. The second boss 523A extends along the axis A2 of the development roller 51M (see FIG. 5). The second boss 523A extends in the first direction. The size of the second boss 523A in the first direction is greater than the size of the first boss 522A in the first direction. The second boss 523B is located at the second side surface S4 of the development housing 521. The description of the second boss 523A is applied in the same way to the second boss 523B.

As shown in FIG. 7, in a state where the development cartridge 5M is attached to the drum cartridge 4M, the second boss 523B is fitted to the second guide 4212. The second boss 523B is pressed toward the photosensitive drum 41M by the second pressing member 48M.

3.2 Second Handle 53M

As shown in FIG. 8, the second handle 53M is located at the center of the development cartridge 5M in the first direction. The second handle 53M is attached to the development frame 52M. The second handle 53M is attached to the center of the development housing 521 in the first direction. The color of the second handle 53M is different from the color of the first handle 43M.

As shown in FIG. 9, in a state where the development cartridge 5M is attached to the drum cartridge 4M, the development housing 521 of the development cartridge 5M is located between the first side plate 421 and the second side plate 422 in the first direction. In a state where the development cartridge 5M is attached to the drum cartridge 4M, the second handle 53M is located between the one end E1 and the other end E2. In a state where the development cartridge 5M is attached to the drum cartridge 4M, the second handle 53M is located upstream of the first handle 43M in the movement direction. The second handle 53M is located between the first handle 43M and the lock 45M in the first direction. In other words, the lock 45M is located at the opposite side of the first handle 43M with respect to the second handle 53M in the first direction. In a state where the development cartridge 5M is attached to the drum cartridge 4M and the drum cartridge 4M is located at the first position (see FIG. 3), even if the cover 10 is located at the open position, the second handle 53M is still located in the housing 2 and is not exposed as viewed in the first direction. In a state where the development cartridge 5M is attached to the drum cartridge 4M and the drum cartridge 4M is located at the second position (see FIG. 4), the second handle 53M is located outside the housing 2 and is exposed.

As shown in FIG. 7, in a state where the development cartridge 5M is attached to the drum cartridge 4M, the second handle 53M is located at the opposite side of the wall 423 with respect to the photosensitive drum 41M. The second handle 53M is rotationally movable between a first position and a second position.

In a state where the second handle 53M is located at the first position, the second handle 53M crosses a direction in which the first guide 4211 extends. In a state where the second handle 53M is located at the first position, the second handle 53M extends along the surface of the development housing 521.

In a state where the second handle 53M is located at the second position, the second handle 53M extends in the direction in which the first guide 4211 extends. As a result, in a state where the development cartridge 5M is attached to the drum cartridge 4M and the second handle 53M is located at the second position, as a user holds the second handle 53M and lifts the development cartridge 5M in the direction in which the first guide 4211 extends, the first boss 522B is pulled out of the first guide 4211 smoothly. This allows the development cartridge 5M to be detached smoothly from the drum cartridge 4M.

In a state where the development cartridge 5M is attached to the drum cartridge 4M and the second handle 53M is located at the second position, the second handle 53M extends from the development housing 521 toward the opposite side of the wall 423. Thus, in a state where the drum cartridge 4M is detached from the housing 2 and is placed on the placement surface X and the development cartridge 5M is attached to the drum cartridge 4M, when the second handle 53M is located at the second position, the second handle 53M extends upward.

4. Detail of Image Forming Apparatus

The image forming apparatus 1 will be described next in detail by referring to FIGS. 1 to 4.

As shown in FIGS. 1 and 2, the image forming apparatus 1 includes four drum guides 17Y, 17M, 17C, and 17K, four rails 12Y, 12M, 12C, and 12K, two metal plates 18A and 18B, four drum pressing units 13Y, 13M, 13C, and 13K, four cams 14Y, 14M, 14C, and 14K, and four support members 16Y, 16M, 16C, and 16K.

4.1 Four Drum Guides 17Y, 17M, 17C, 17K

As shown in FIG. 1, the four drum guides 17Y, 17M, 17C, and 17K are located in the housing 2. The four drum guides 17Y, 17M, 17C, and 17K are supported by the exposure device 6. The four drum guides 17Y, 17M, 17C, and 17K are separated from each other in the second direction.

The four drum guides 17Y, 17M, 17C, and 17K have the same structure. Thus, while the drum guide 17M will be described in detail, the descriptions of the three drum guides 17Y, 17C, and 17K will be omitted. The drum guide 17M guides the movement of the drum cartridge 4M between the first position and the second position. The drum guide 17M extends in the first direction. The drum guide 17M extends along the bottom plate 424 of the drum frame 42M.

4.2 Four Rails 12Y, 12M, 12C, 12K

The four rails 12Y, 12M, 12C, and 12K are located in the housing 2. The four rails 12Y, 12M, 12C, and 12K are supported by the exposure device 6. The rail 12Y is located between the drum guide 17Y and the drum guide 17M in the second direction. The rail 12M is located between the drum guide 17M and the drum guide 17C in the second direction. The rail 12C is located between the drum guide 17C and the drum guide 17K in the second direction. The rail 12K is located at the opposite side of the rail 12C with respect to the drum guide 17K in the second direction.

The four rails 12Y, 12M, 12C, and 12K have the same structure. Thus, while the rail 12M will be described in detail, the descriptions of the three rails 12Y, 12C, and 12K will be omitted.

4.2.1 Rail 12M

The rail 12M guides the slide portion 425 when the drum cartridge 4M moves between the first position and the second position. The rail 12M includes a first wall 121, a second wall 122, and a third wall 123.

The first wall 121 extends in the first direction. The first wall 121 is located between the light emitting opening 61M and the drum guide 17M in the second direction. The second wall 122 extends in the first direction. The second wall 122 is located at the opposite side of the first wall 121 with respect to the light emitting opening 61M in the second direction. The third wall 123 is located between the first wall 121 and the second wall 122 in the second direction. The third wall 123 connects the center of the first wall 121 in the vertical direction and the center of the second wall 122 in the vertical direction to each other.

As shown in FIG. 2, the third wall 123 includes an opening 1231, a first hole 1232, and a second hole 1233.

The opening 1231 is for allowing light emitted from the light emitting opening 61M of the exposure device 6 to pass through. After passing through the opening 1231, the light passes through a position between the two side walls 4251A and 4251B, and then exposes the photosensitive drum 41M. The opening 1231 extends in the first direction.

The first hole 1232 is located away from the opening 1231 in the first direction. A first drum pressing member 131 is arranged in the first hole 1232. The first drum pressing member 131 will be described later.

The second hole 1233 is located at the opposite side of the first hole 1232 with respect to the opening 1231 in the first direction. A second drum pressing member 132 is arranged in the second hole 1233. The second drum pressing member 132 will be described later.

As shown in FIG. 1, in a state where the drum cartridge 4M is located at the first position, the slide portion 425 is located at a position between the first wall 121 and the second wall 122 and above the third wall 123. In a state where the drum cartridge 4M is located at the first position, the slide portion 425 is located between the photosensitive drum 41M and the third wall 123.

4.3 Two Metal Plates 18A, 18B

As shown in FIG. 2, in a state where the cover 10 is located at the closed position and the drum cartridge 4M is located at the first position, the two metal plates 18A and 18B position the four photosensitive drums 41Y, 41M, 41C, and 41K relative to the housing 2. The two metal plates 18A and 18B are supported by the housing 2. Each of the two metal plates 18A and 18B has an L shape. In a state where the cover 10 is located at the closed position, the metal plate 18A is located between the cover 10 and the intermediate transfer device 7 in the first direction. The metal plate 18A is aligned with the intermediate transfer device 7 in the first direction. The metal plate 18B is located at the opposite side of the metal plate 18A with respect to the intermediate transfer device 7.

4.4 Four Drum Pressing Units 13Y, 13M, 13C, 13K

As shown in FIG. 1, the four drum pressing units 13Y, 13M, 13C, and 13K have the same structure. Thus, while the drum pressing unit 13M will be described in detail, the descriptions of the three drum pressing units 13Y, 13C, and 13K will be omitted.

In a state where the drum cartridge 4M is located at the first position, the drum pressing unit 13M is configured to press the photosensitive drum 41M toward the intermediate transfer device 7.

4.4.1 Drum Pressing Unit 13M

As shown in FIG. 2, in a state where the drum cartridge 4M is located at the first position, the drum pressing unit 13M is located at the opposite side of the photosensitive drum 41M with respect to the drum frame 42M. The drum pressing unit 13M is located between the first wall 121 and the second wall 122 of the rail 12M. The drum pressing unit 13M includes the first drum pressing member 131 and the second drum pressing member 132.

As shown in FIGS. 2 and 3, the first drum pressing member 131 is located in the first hole 1232. In a state where the drum cartridge 4M is located at the first position, the first drum pressing member 131 is located at the opposite side of the metal plate 18A with respect to the first side plate 421. The first drum pressing member 131 is movable between a pressing position (see FIG. 2) and a release position (see FIG. 3). In a state where the drum cartridge 4M is located at the first position and the first drum pressing member 131 is located at the pressing position, the first drum pressing member 131 presses the first side plate 421 toward the intermediate transfer device 7 (see FIG. 2). In a state where the drum cartridge 4M is located at the first position and the first drum pressing member 131 is located at the release position, the first drum pressing member 131 releases the pressure on the first side plate 421 (see FIG. 3).

As shown in FIG. 1, the first drum pressing member 131 includes a contact part 1311, two bosses 1312A and 1312B, and a spring 1313.

As shown in FIG. 2, in a state where the drum cartridge 4M is located at the first position, the contact part 1311 contacts the first side plate 421. The contact part 1311 extends in the vertical direction. The contact part 1311 has a cylindrical shape. The contact part 1311 has a closed upper end. The contact part 1311 has an open lower end.

Each of the two bosses 1312A and 1312B is fitted in a first elongated hole 1411. The first elongated hole 1411 will be described later. The boss 1312A protrudes from the contact part 1311. The boss 1312A extends in the second direction. The boss 1312B is located at the opposite side of the boss 1312A with respect to the contact part 1311. The description of the boss 1312A is applied in the same way to the boss 1312B.

The spring 1313 presses the contact part 1311 toward the photosensitive drum 41M. The spring 1313 is arranged in the contact part 1311.

In a state where the first drum pressing member 131 is located at the pressing position, the contact part 1311 protrudes upward from the third wall 123. In a state where the first drum pressing member 131 is located at the release position, the contact part 1311 is located at a lower position than the pressing position so that the contact part 1311 becomes flush with the third wall 123.

The second drum pressing member 132 is located at the opposite side of the first drum pressing member 131 with respect to the light emitting opening 61M in the first direction. The second drum pressing member 132 is arranged in the second hole 1233. The second drum pressing member 132 is located at the opposite side of the metal plate 18B with respect to the second side plate 422. The description of the first drum pressing member 131 is applied in the same way to the second drum pressing member 132. Thus, the description of the second drum pressing member 132 will be omitted. The second drum pressing member 132 includes a contact part 1321, a boss 1322A, and a spring 1323.

In a state where the drum cartridge 4M is located at the first position and the second drum pressing member 132 is located at the pressing position, the second drum pressing member 132 presses the second side plate 422 toward the intermediate transfer device 7 (see FIG. 2).

Thus, in a state where the drum cartridge 4M is located at the first position and each of the first drum pressing member 131 and the second drum pressing member 132 is located at the pressing position, the second drum pressing member 132 operates in cooperation with the first drum pressing member 131 to press the photosensitive drum 41M toward the intermediate transfer device 7. At this time, the first side plate 421 contacts the metal plate 18A and the second side plate 422 contacts the metal plate 18B. By doing so, the photosensitive drum 41M contacts the intermediate transfer belt 71 and is positioned relative to the housing 2.

In a state where the drum cartridge 4M is located at the first position and the second drum pressing member 132 is located at the release position, the second drum pressing member 132 releases the pressure on the second side plate 422 (see FIG. 3).

Thus, in a state where the drum cartridge 4M is located at the first position and each of the first drum pressing member 131 and the second drum pressing member 132 is located at the release position, the second drum pressing member 132 operates in cooperation with the first drum pressing member 131 not to press the photosensitive drum 41M toward the intermediate transfer device 7. As a result, the first side plate 421 becomes separated from the metal plate 18A and the second side plate 422 becomes separated from the metal plate 18B. By doing so, the photosensitive drum 41M is separated from the intermediate transfer belt 71 and is released from the positioning relative to the housing 2.

4.5 Four Cams 14Y, 14M, 14C, 14K

As shown in FIG. 1, the four cams 14Y, 14M, 14C, and 14K have the same structure. Thus, while the cam 14M will be described in detail, the descriptions of the three cams 14Y, 14C, and 14K will be omitted. The three cams 14Y, 14C, and 14K are not shown in the drawings.

4.5.1 Cam 14M

As shown in FIGS. 2 and 3, in a state where the cover 10 is located at the closed position, the cam 14M causes each of the first drum pressing member 131 and the second drum pressing member 132 to be located at the pressing position. In a state where the cover 10 is located at the open position, the cam 14M causes each of the first drum pressing member 131 and the second drum pressing member 132 to be located at the release position.

As shown in FIG. 1, the cam 14M is located at a position between the first wall 121 and the second wall 122 and below the third wall 123 of the rail 12M. The cam 14M extends in the first direction. The cam 14M is movable in the first direction in conjunction with the movement of the cover 10. The cam 14M is connected to the cover 10 by a linking member 15M. The linking member 15M connects the cam 14M and the cover 10 to each other. The cam 14M includes a first plate 141 and a second plate 142.

The first plate 141 is located between the drum pressing unit 13M and the first wall 121 in the second direction. As shown in FIG. 2, the first plate 141 extends in the first direction. The first plate 141 includes the first elongated hole 1411 and a second elongated hole 1412.

The boss 1312A of the first drum pressing member 131 is fitted in the first elongated hole 1411. The first elongated hole 1411 has one end and an other end in the first direction. The one end of the first elongated hole 1411 in the first direction is located at position higher than the other end of the first elongated hole 1411 in the first direction. The first elongated hole 1411 is slanted downward in a direction from the one end toward the other end.

The boss 1322A of the second drum pressing member 132 is fitted in the second elongated hole 1412. The second elongated hole 1412 is located away from the first elongated hole 1411 in the first direction. The description of the first elongated hole 1411 is applied in the same way to the second elongated hole 1412. Thus, the description of the second elongated hole 1412 will be omitted.

In a state where the cover 10 is located at the closed position and each of the first drum pressing member 131 and the second drum pressing member 132 is located at the pressing position, the boss 1312A is located at the one end of the first elongated hole 1411 and the boss 1322A is located at the one end of the second elongated hole 1412. In a state where the cover 10 is located at the open position and each of the first drum pressing member 131 and the second drum pressing member 132 is located at the release position, the boss 1312A is located at the other end of the first elongated hole 1411 and the boss 1322A is located at the other end of the second elongated hole 1412 (see FIG. 3).

As shown in FIG. 1, the second plate 142 is located between the drum pressing unit 13M and the second wall 122 in the second direction. The description of the first plate 141 is applied in the same way to the second plate 142. Thus, the description of the second plate 142 will be omitted.

4.6 Four Support Members 16Y, 16M, 16C, 16K

The four support members 16Y, 16M, 16C, and 16K have the same structure. Thus, while the support member 16M will be described in detail, the descriptions of the three support members 16Y, 16C, and 16K will be omitted. The three support members 16Y, 16C, and 16K are not shown in the drawings.

The support member 16M moves together with the cover 10. The support member 16M is connected to the rail 12M so as to rotationally move relative to the rail 12M. In a state where the cover 10 is located at the closed position, the support member 16M is located in the housing 2. In a state where the drum cartridge 4M is located at the first position and the cover 10 is located at the closed position, the support member 16M extends in the vertical direction and is located between the cover 10 and the first side plate 421. As shown in FIG. 3, in a state where the cover 10 is located at the open position, at least part of the support member 16M is located outside the housing 2. In a state where the cover 10 is located at the open position, the support member 16M extends in the first direction and is continuous with the rail 12M. In a state where the cover 10 is located at the open position and the drum cartridge 4M is located at the second position, the support member 16M supports the drum cartridge 4M (see FIG. 4). The support member 16M includes a main body 161, a hinge 162, and a boss 163.

In a state where the cover 10 is located at the open position, the main body 161 has a U shape opened upward. In a state where the cover 10 is located at the open position, the main body 161 extends in the first direction and is continuous with the rail 12M. In a state where the cover 10 is located at the open position and the drum cartridge 4M is located at the second position, at least part of the slide portion 425 is fitted to the main body 161. The main body 161 has one end and an other end. The other end of the main body 161 is located away from the one end.

The hinge 162 is located at the one end of the main body 161. The hinge 162 connects the main body 161 and the first wall 121 to each other. This allows the main body 161 to rotationally move relative to the rail 12M.

The boss 163 is located at the other end of the main body 161. The boss 163 extends in the second direction. The boss 163 is fitted in an elongated hole 1011 of a connecting portion 101M. The connecting portion 101M is provided at the cover 10. As shown in FIG. 2, in a state where the cover 10 is located at the closed position and the drum cartridge 4M is located at the first position, the connecting portion 101M is located between the cover 10 and the first side plate 421. In a state where the cover 10 is located at the closed position, the elongated hole 1011 extends in the vertical direction.

5. Operations and Effects

In the image forming apparatus 1, the development cartridge 5M containing toner and including the development roller 51M and the drum cartridge 4M including the photosensitive drum 41M can be individually replaced.

The first handle 43M of the drum cartridge 4M is located at the downstream end of the drum cartridge 4M in the movement direction. In a state where the development cartridge 5M is attached to the drum cartridge 4M, the second handle 53M of the development cartridge 5M is located upstream of the first handle 43M in the movement direction.

Thus, as shown in FIG. 3, in a state where the development cartridge 5M is attached to the drum cartridge 4M and the drum cartridge 4M is located at the first position, the user can recognize the first handle 43M more easily than the second handle 53M. Then, the user can move the drum cartridge 4M from the first position to the second position by holding the first handle 43M. After that, as shown in FIG. 4, in a state where with the drum cartridge 4M is located outside the housing 2, after visually confirming the development cartridge 5M, the user can hold the second handle 53M and remove the development cartridge 5M from the drum cartridge 4M.

Thus, the user does not need to determine the cartridge to be replaced, in a state where the development cartridge 5M and the drum cartridge 4M are located in the housing 2. The user can move the drum cartridge 4M from the first position to the second position by holding the first handle 43M which is easily recognizable, and then remove the development cartridge 5M from the drum cartridge 4M by holding the second handle 53M.

Thus, the development cartridge 5M and the drum cartridge 4M can be exchanged individually and smoothly.

While the disclosure has been described in detail with reference to the above aspects thereof, it would be apparent to those skilled in the art that various changes and modifications may be made therein without departing from the scope of the claims.

What is claimed is:

1. An image forming apparatus comprising:

a housing having an opening;

a drum cartridge movable in a first direction through the opening between:

a first position at which the drum cartridge is located inside the housing; and a second position at which the drum cartridge is located outside the housing, the drum cartridge including:

a photosensitive drum rotatable about an axis extending in the first direction;

a drum frame supporting the photosensitive drum; and a first handle located at a downstream end of the drum frame in a movement direction in which the drum cartridge moves from the first position to the second position; and a development cartridge including:

a development roller configured to supply toner to the photosensitive drum; and a development frame supporting the development roller, the development cartridge being unattachable to and undetachable from the drum cartridge in a state where the drum cartridge is located at the first position, and the development cartridge being attachable to and detachable from the drum cartridge in a state where the drum cartridge is located at the second position.

2. The image forming apparatus according to claim 1, wherein the drum frame includes:

a first side plate located at a downstream end of the drum frame in the movement direction; and a second side plate located at an upstream end of the drum frame in the movement direction.

3. The image forming apparatus according to claim 2, wherein the first handle is disposed on the first side plate.

4. The image forming apparatus according to claim 3, wherein the first handle is rotationally movable between a folded position and a protruding position;

wherein, in a state where the first handle is located at the folded position, the first handle extends along the first side plate; and wherein, in a state where the first handle is located at the protruding position, the first handle protrudes from the first side plate in the first direction.

5. The image forming apparatus according to claim 1, wherein the development cartridge comprises a second handle on the development frame.

6. The image forming apparatus according to claim 5, wherein the second handle is rotationally movable between:

a first handle position at which the second handle extends along a surface of the development frame; and a second handle position at which the second handle protrudes from the surface of the development frame.

7. The image forming apparatus according to claim 1, wherein the drum frame includes:

a first side plate located at a downstream end of the drum frame in the movement direction; and a second side plate located at an upstream end of the drum frame in the movement direction; and wherein, in a state where the development cartridge is attached to the drum cartridge, at least a part of the development cartridge is disposed between the first side plate of the drum frame and the second side plate of the drum frame.

8. The image forming apparatus according to claim 7, further comprising a pressing member configured to press the development roller toward the photosensitive drum in a state where the development cartridge is attached to the drum cartridge, the pressing member being supported by the drum frame.

9. The image forming apparatus according to claim 7, wherein the drum frame includes a lock configured to restrict detachment of the development cartridge from the drum cartridge in a state where the development cartridge is attached to the drum cartridge.

10. The image forming apparatus according to claim 1, further comprising:

a cover movable between an open position at which the cover opens the opening and a closed position at which the cover closes the opening;

an intermediate transfer device to which toner on the photosensitive drum is transferred;

a drum pressing member movable between:

a pressing position at which the drum pressing member presses the drum cartridge toward the intermediate transfer device; and a release position at which the drum pressing member does not press the drum cartridge toward the intermediate transfer device; and a cam movable in the first direction in conjunction with opening and closing of the cover, the cam being configured to:

in a state where the cover is located at the closed position, cause the drum pressing member to be located at the pressing position; and in a state where the cover is located at the open position, cause the drum pressing member to be located at the release position.

* * * * *